United States Patent
Heermann

(10) Patent No.: US 12,480,612 B2
(45) Date of Patent: Nov. 25, 2025

(54) METHOD OF FABRICATING AN INSULATION ELEMENT

(71) Applicant: ROCKWOOL A/S, Hedehusene (DK)

(72) Inventor: Harald Heermann, Gladbeck (DE)

(73) Assignee: Rockwool A/S, Hedehusene (DK)

(*) Notice: Subject to any disclaimer, the term of this patent is extended or adjusted under 35 U.S.C. 154(b) by 0 days.

(21) Appl. No.: 18/857,557

(22) PCT Filed: Apr. 21, 2023

(86) PCT No.: PCT/EP2023/060383
§ 371 (c)(1),
(2) Date: Oct. 17, 2024

(87) PCT Pub. No.: WO2023/203180
PCT Pub. Date: Oct. 26, 2023

(65) Prior Publication Data
US 2025/0341274 A1 Nov. 6, 2025

(30) Foreign Application Priority Data
Apr. 22, 2022 (EP) .................................... 22169536

(51) Int. Cl.
*F16L 59/18* (2006.01)
(52) U.S. Cl.
CPC .................................... *F16L 59/18* (2013.01)
(58) Field of Classification Search
CPC ....... F16L 59/168; F16L 59/18; F16L 59/024; F16L 59/028
See application file for complete search history.

(56) References Cited

U.S. PATENT DOCUMENTS 3,631,898 A 1/1972 Harley

FOREIGN PATENT DOCUMENTS

DE 4138212 A1 5/1993
DE 202010006899 U1 8/2010
(Continued)

OTHER PUBLICATIONS

DE 4138212 English translation (Year: 1993).*

*Primary Examiner* — Jason L Vaughan
*Assistant Examiner* — Amanda Kreiling
(74) *Attorney, Agent, or Firm* — Harness, Dickey & Pierce, P.L.C.

(57) ABSTRACT

The invention relates to a method of fabricating an insulation element (2) as an insulation box, cap or cover for a valve, a flange or a fitting insulation within a piping system of a technical building equipment. Said method comprising the steps of forming a block of insulating material to be provided with a cavity having a contour of the valve, the flange or the fitting insulation and an outer contour, whereby the block is divided into at least two parts, preferably two halves (3) of the insulation box, cap or cover, and forming a complementary insulating covering (6) having an inner contour according to the outer contour of the block. To provide a method of fabricating the insulation element (2) having increased properties in view of combustibility and being cost saving because of an easy and less complex method for manufacturing insulation elements (2) which can be used at least for a range of valves, flanges or fitting insulations within a piping system of a technical building equipment having different sizes and/or outer contours the insulation element (2) and the complementary insulating covering (6) are produced separately from each other and joined together, whereby the block is produced from mineral wool, i.e. mineral fibers bound with a binding agent, and the complementary insulating covering (6) is produced from a plastically deformable material being mechanically pressed or molded to be provided with the inner contour corresponding to the outer contour of the block provided with the cavity.

8 Claims, 4 Drawing Sheets

(56) References Cited

FOREIGN PATENT DOCUMENTS

Figure 1:
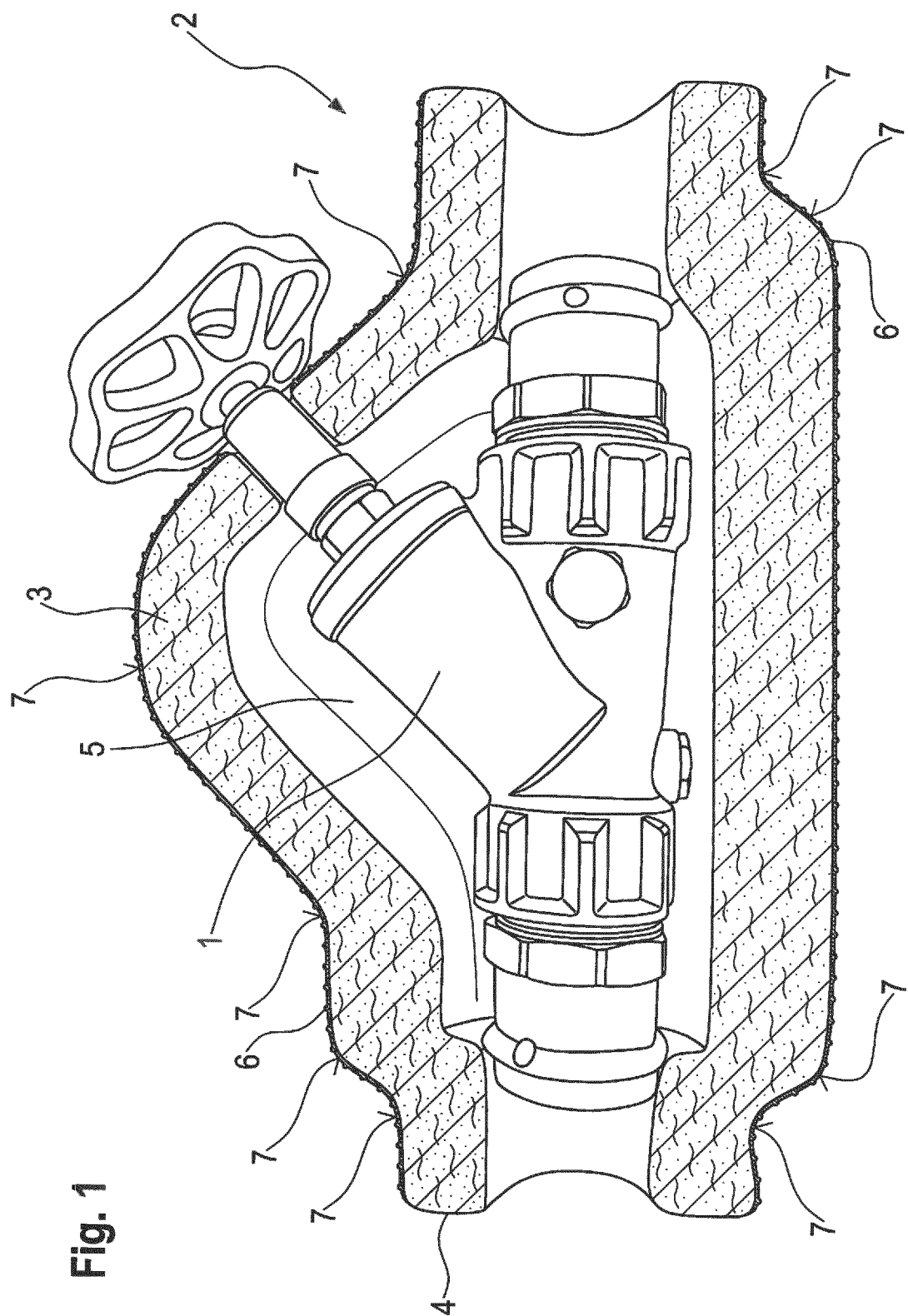

| DE | 202020107174 U1 | 3/2022 |
|---|---|---|
| KR | 20130000195 A | 1/2013 |

\* cited by examiner

METHOD OF FABRICATING AN INSULATION ELEMENT

The invention relates to a method of fabricating an insulation element as an insulation box, cap or cover for a valve, a flange or a fitting insulation within a piping system of a technical building equipment. Said method comprising the steps of forming a block of insulating material to be provided with a cavity having a contour of the valve, the flange or the fitting insulation and an outer contour, whereby the block is divided into at least two parts, preferably two halves of the insulation box, cap or cover, and forming a complementary insulating covering having an inner contour according to the outer contour of the block.

Insulation elements as insulation box, cap or cover for a valve, a flange or a fitting insulation within a piping system of a technical building equipment are well known from the prior art. These insulation elements are commercially available based on combustible insulating foams, e.g. polyurethane rigid foam (PUR), expanded (EPP) or extruded (XPE) polypropylene or polyethylene soft foam (PE). The use of such materials for fabricating these insulation elements has different drawbacks. One of these drawbacks is the combustibility of the foams so that the use of these insulation elements is not allowed in certain areas of the technical building equipment.

Furthermore, fabricating of these insulation elements made of foam materials is difficult and cost-intensive as for each valve, flange or fitting with different outer contours or shapes and sizes an exact copy of the outer contour of these elements has to be taken to either control a machine cutting the contour into the starting material, namely the block of insulating material, or to provide multiple matrices for respective foam molding processes.

U.S. Pat. No. 3,631,898 discloses a method of fabricating an insulating pipe joint fitting from block material comprising the steps of cutting a block of insulating material to a rectangular configuration of a size sufficient to cover and insulate at least one-half of a pipe joint fitting, grinding the insulation covering generally to the contour of one-half of the exterior of the pipe joint fitting to be covered by displacing the block material relative to an abrading surface, positioning the block material in a stationary manner, displacing an abrading surface normal to the stationary block, removing portions of the block and forming a contoured axially curved internal cavity of varying depths by engaging the block material with one or more abrading surfaces, forming a complementary insulating covering in the same manner to be received cooperatively by the first half insulating covering and a pipe joint therein, adhering the two halves of the covering over a fitting to be covered, and adhering a contoured vinyl shield over the entire exterior portions of said insulating halves. As insulation materials polyurethane, polystyrene, foamed glass, magnesia, calcium silicate are used having the drawbacks already mentioned above. E.g., special measures are required in order to reduce flammability of a polyurethane insulating material which is to be treated with sodium silicate either by coating or spraying, hence adding to the cost and complexity of the method of fabricating.

It is therefore an object of the invention to provide a method of fabricating an insulation element as an insulation box, cap or cover for a valve, a flange or a fitting insulation within a piping system of a technical building equipment having increased properties in view of combustibility and being cost saving because of an easy and less complex method manufacturing insulation elements which can be used at least for a range of valves, flanges or fitting insulations within a piping system of a technical building equipment having different sizes and/or outer contours.

The object is solved with a method having the features of claim 1, especially in that the block and the complementary insulating covering are produced separately from each other and joined together, whereby the block is produced from mineral wool, i.e. mineral fibers bound with a binding agent, and the complementary insulating covering is produced from a plastically deformable material being mechanically pressed or molded to be provided with the inner contour corresponding to the outer contour of the block provided with the cavity.

According to the invention, the insulation material for the block is mineral wool, preferably stone wool, which is non-combustible showing good heat insulation properties and can be used in nearly all areas within piping systems of the technical building equipments, for example where the insulation of fittings in pipe systems is very complex. Insulation elements fabricated according to the invention opens up the possibility for the use even in complex cold insulation areas. Advantageously, such insulation elements manufactured according to the method of the invention and made from mineral wool can even be used in escape routes in buildings, where high requirements with respect to fire protection in buildings exist.

Furthermore, mineral wool has the advantage that depending on bulk density the inner contour of the insulation element to be in contact with a valve, a flange or a fitting insulation has a certain flexibility which allows to use and to adapt the insulation element to a certain range of valves, flanges or fitting insulations having different sizes or shapes without losing a direct and full contact of the insulation element to the outer surface of the valve, flange or fitting insulation.

According to a further feature of the invention, a single or multi-layer metal foil as complementary insulating covering is manufactured and used. Said covering provides for a vapour barrier layer which is impermeable for moisture, preventing ingress of same and thus avoiding harmful condensation. The complementary insulating covering made of a single or multi-layer metal foil has a high inherent stability which has the additional effect that the block made of mineral wool can be stabilized even when mineral wool of lower bulk density is used. Mineral wool of lower bulk density has the advantage that the inner contour of the cavity to be brought into contact with the valves, flanges or fitting insulations having different sizes or shapes has a high flexibility allowing an adapted fit to the valves, flanges or fitting insulations.

The complementary insulating covering according to the present invention, typically consists of two individual parts fitting the respective halves of the block of insulating material. However, according to an embodiment, it can exist of two halves, whereby each half is connected to the block in that each half covers each half of the block thereby connecting the two halves of the block as clamping and/or clipping element. Both halves of the complementary insulating covering are connected to each other, whereby both halves are connected via a kind of hinge, e.g. formed by the metal foil itself and being part of both halves, or being separate from the halves, e.g. an adhesive tape, preferably made from a metal foil. The complementary insulating covering can be produced and delivered as a single element to be adapted to the block, easily.

The complementary insulating covering is produced separately from the block of insulating material. It's made of a plastically deformable material being mechanically pressed or molded to be provided with an inner contour corresponding to the outer contour of the block. This way it is ensured that the complementary insulating covering can easily be adapted to the block of insulating material without the risk of any damages, e.g. in form of tension cracks or unwanted wrinkles. Such damages cannot be avoided forming the complementary insulating covering together with the shaped block in a press or mold, or if applied to the block in the form of the original foil, i.e. without being preformed. Hence, a key feature of the method according to the invention is the separate preforming of the complementary insulating covering using a plastically deformable material. Doing so, it is ensured that the metal foil of the covering can be applied in an aesthetically pleasing manner and, most important, it is not damaged which would compromise its vapour retarding properties. The complementary insulating covering typically is applied to the block on the factory, i.e. prior to the installation within a piping system, but can also be applied to the block after the block has been applied to the valve, flange or fitting insulation, which means that the complementary insulating covering can be applied on site. This advantage opens for the use of the complementary insulating covering as clamping element in that a half of the complementary insulating covering covers both halves of the block thereby connecting the halves of the block.

Preferably, the cavity is produced by grinding the outer contour of a part of the valve, the flange or the fitting insulation into the block, whereby the block is provided with a predetermined unitary thickness. The unitary thickness provides an insulation element with unitary heat insulation properties in all areas of the insulation element surrounding the valve, flange or fitting insulation. Nevertheless, the insulation element providing the cavity can be produced in different ways, for example by pressing a block of mineral wool containing mineral fibres and a binding agent with a cavity having the shape according to the valve, flange or fitting insulation in a forming device and stabilizing the shape of the cavity by, for example, hardening the binding agent before removing the block from the forming device.

To further increase the mechanical stability of the complementary insulating covering, a single or multi-layer grid-reinforced aluminium foil is used as starting material for the complementary insulating covering.

According to a further feature of the invention the block and the complementary insulating covering are connected to each other by applying a glue or adhesive to the outer contour of the block and/or the inner contour of the complementary insulating covering and pressing the complementary insulating covering onto the block. The use of the glue or adhesive has the advantage that a long-time lasting connection between the block and the complementary insulating covering comes into existence which increases the connection properties compared to a form-fit connection which is possible, too, and may be sufficient in certain areas of a piping system of a technical building equipment.

To easily assemble the insulation element to the piping system it is of advantage that the parts of the block being covered with the complementary insulating covering are connected with an adhesive tape. Such an adhesive tape can already be part of the complementary insulating covering to be applied to the block, e.g. in the form of a self-adhesive lap.

Preferably, a glass fibre scrim reinforcement embedded between two layers of aluminium each having a thickness of 10 μm to 30 μm is used as primary material for the plastically deformable material from which the complementary insulating covering is produced separate from the block. The complementary insulating covering may be one layered or multi-layered, whereby an sa value of at least 1.500 m is fulfilled. The sa value defines a water-vapour-diffusion-equivalent air layer thickness and is a well-defined product property.

Preferably, an insulation element made of mineral wool having a bulk density between 50 kg/m$^3$ and 200 kg/m$^3$, preferably between 100 kg/m$^3$ and 180 kg/m$^3$ and further preferably of 140 kg/m$^3$ is used as primary material for the block. Such a primary material fulfils the requirements of stability and flexibility inside the cavity and can easily be grinded to form the cavity and/or the outer contour of the insulation element. The bulk density assures that the amount of mineral fibres removed by grinding is mostly limited to those mineral fibres which have to be removed. The surface inside the cavity stays smooth without areas where mineral fibers have been removed creating apertures inside the surface of the cavity. The same is valid with respect to the outer surface of the block to be brought into contact and to be connected to the complementary insulating covering. Apertures in the outer surface of the block would increase the amount of glue or adhesive to connect the block with the complementary insulating covering as the glue or adhesive may be collected in such apertures.

To limit the glue or adhesive needed to connect the block and the complementary insulating covering the glue or adhesive can be sprayed or otherwise be applied to the outer contour of the block and/or the inner contour of the complementary insulating covering. Spraying the glue or adhesive onto the surface increases the production velocity and assures a homogenous coat application on both parts even if only a small amount of glue or adhesive is used which can increase the non-combustibility of the insulation element.

Finally, according to a further feature of the invention, all transition sections in the outer contour of the block are chamfered. According to this feature all surface areas of the block are rounded and do not show sharp edges which can be a source of breaking the complementary insulating covering while applying to the block or during mounting or the time of use because of different thermal expansion of the materials used.

Figure 2:
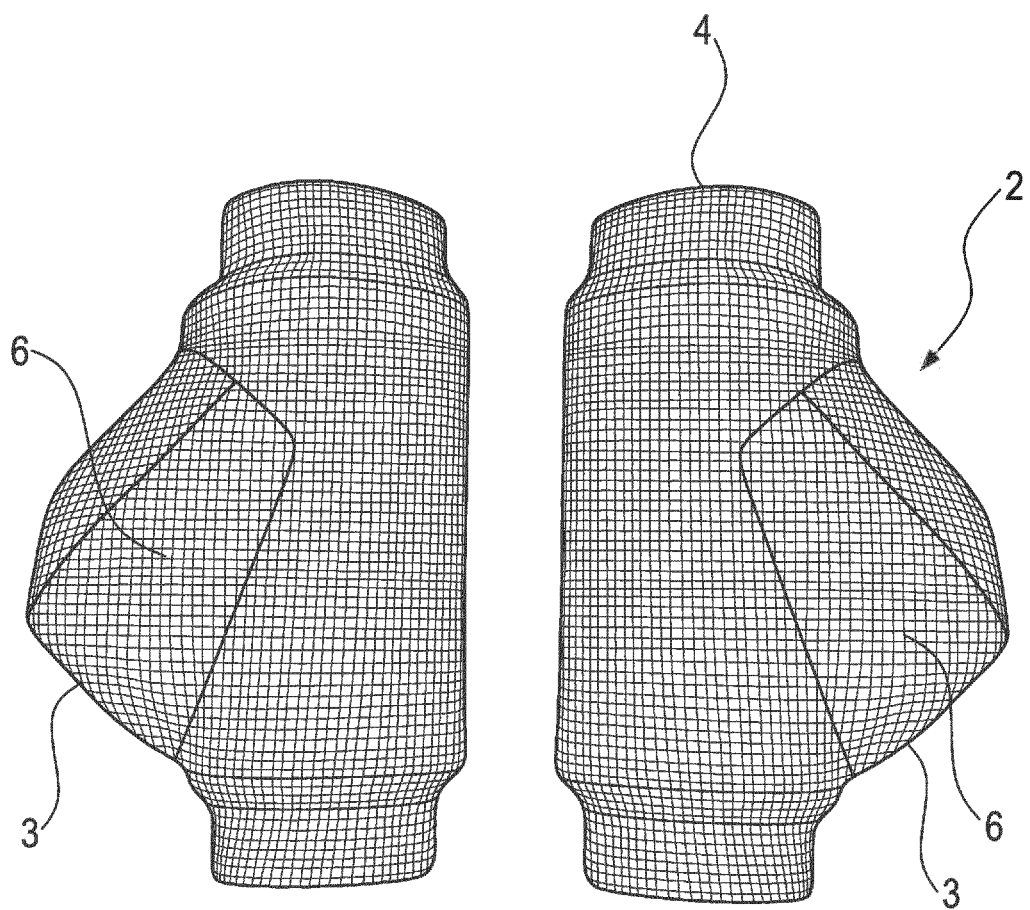
Figure 3:
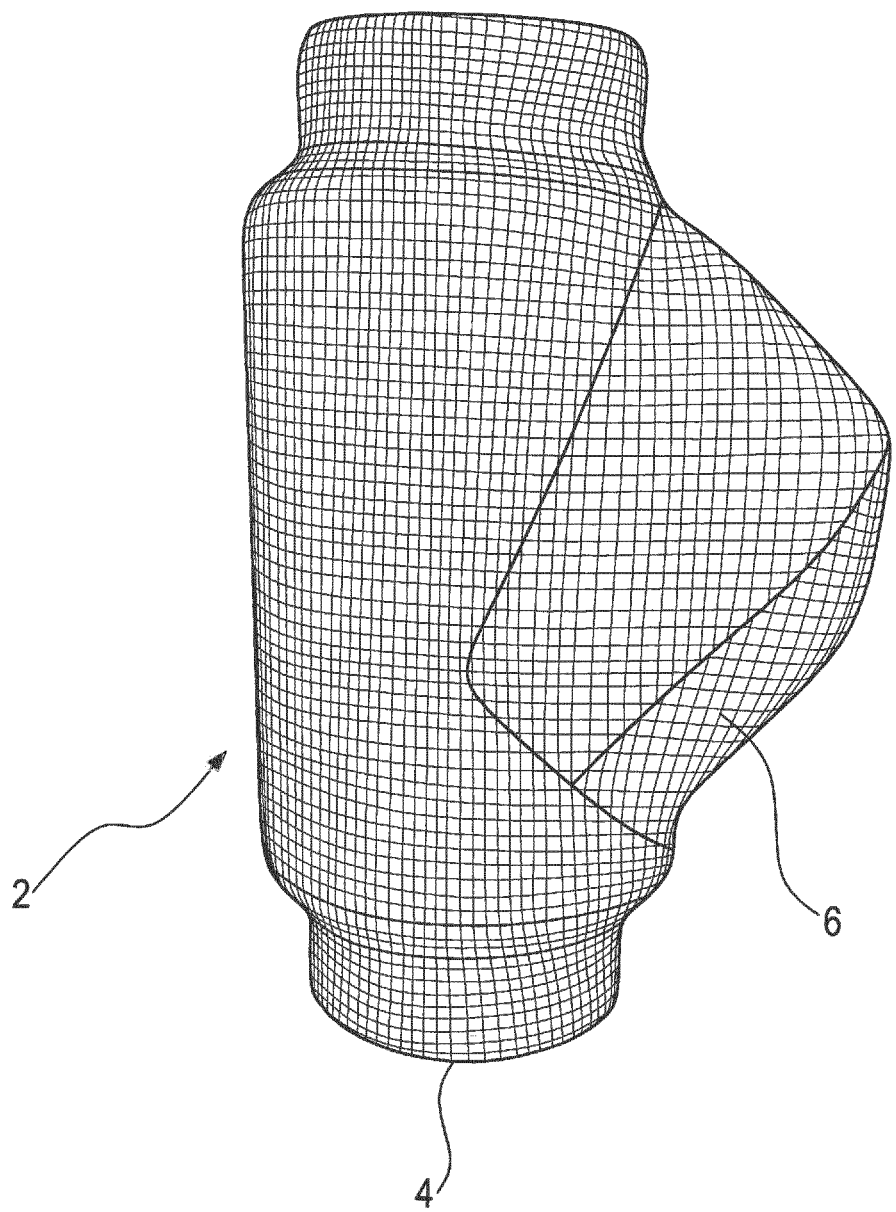
Figure 4:
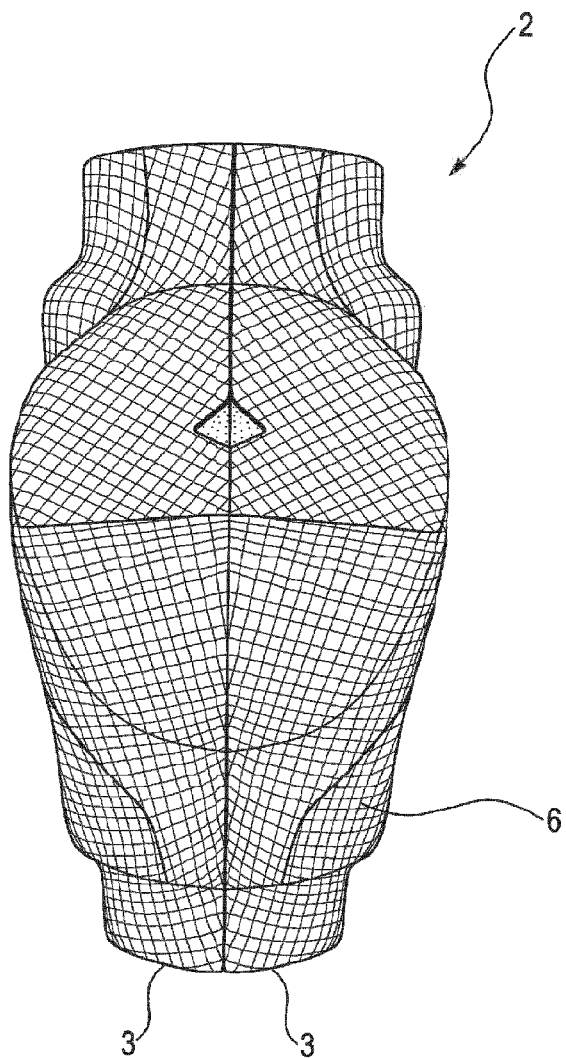

The invention is illustrated in the accompanying drawings showing preferred embodiments of the invention. The drawings show in:

FIG. 1 a half of an insulation element with an embedded valve in an open side view;

FIG. 2 two corresponding halves of the insulation element according to FIG. 1 in a side view;

FIG. 3 the insulation element according to FIGS. 1 and 2 in a first side view and FIG. 4 the insulation element according to FIG. 3 in a second side view.

FIG. 1 shows a valve 1 being embedded in an insulation element 2 which consists of two complementary halves 3, of which only one half 3 is shown in FIG. 1, whereas FIG. 2 shows both complementary halves 3 without the valve 1. As the valve 1 is already well known in the prior art and not part of the invention a detailed description of the valve 1 is not necessary.

The insulation element 2 being formed as an insulation box for the valve 1 consists of a block 4 of insulating material provided with a cavity 5 having a contour substantially of the valve 1, and a complementary insulating covering 6 having an inner contour according to the outer contour of the block 4. The block 4 consists of or comprises mineral fibers bound by a binding agent. The block 4 made of mineral wool has a bulk density of 140 kg/m³ which allows to manufacture the cavity 5 by grinding.

The complementary insulating covering 6 is produced separately from the block 4 from a plastically deformable material being mechanically pressed to be provided with the inner contour corresponding to the outer contour of the block 4, namely a glass fibre scrim enforcement embedded between two layers of aluminium each having a thickness of 18 μm. This material can be pressed into a predetermined contour and is stable because of its plastically deformability. It has a sa value of 1.500 m and is a water vapour barrier having a temperature resistance between −40° C. and 100° C. The glass fibre scrim reinforces both foils of aluminium embedding the glass fibre scrim, whereby the aluminium foils have a thickness of 18 μm each. Other thicknesses may be suitable. The aluminium foils can be lacquered, perforated and/or printed. The thicknesses of the foils can differ from each other and/or be larger.

The complementary insulating cover 6 is applied to the block 4 after block 4 is divided into the two halves 3 and the cavity 5 is provided in the halves 3 so that the insulation element 2 can be built together by applying one complementary cover 6 to each half 3 of the block 4.

The block 4 is provided with a predetermined unitary thickness in the area surrounding the valve 1. The complementary insulating covering 6 is arranged on the outer surface of the block 4, whereby a glue (not shown) forming a third layer of the insulation element 2 is applied by spraying to the surface of the complementary insulating covering 6 facing to the block 4.

The block 4 has several transition sections 7 in the outer contour of the block 4 which are all chamfered avoiding any sharp edges which can break the complementary insulating covering 6 during the process of applying the complementary insulating covering 6 onto the block 4.

LIST OF REFERENCE SIGNS

1 valve
2 insulation element
3 half
4 block
5 cavity
6 covering
7 transition section

The invention claimed is:

1. A method of fabricating an insulation element as an insulation box, cap or cover for a valve, a flange or a fitting within a piping system of a technical building equipment comprising the steps of forming a block of insulating material to be provided with a cavity having a contour of the valve, the flange or the fitting and an outer contour, whereby the block is divided into at least two parts, preferably two halves of the insulation box, cap or cover, and forming a complementary insulating covering having an inner contour according to the outer contour of the block, whereby the block and the complementary insulating covering are produced separately from each other and joined together, whereby the block is produced from mineral wool and the complementary insulating covering is produced from a plastically deformable material being mechanically pressed or molded to be provided with the inner contour corresponding to the outer contour of the block provided with the cavity, wherein a glass fibre scrim reinforcement embedded between two layers of aluminum each having a thickness of 10 μm to 30 μm, preferably of 18 μm is used as primary material for the plastically deformable material.

2. The method according to claim 1, wherein the cavity is produced by grinding the outer contour of a part of the valve, the flange or the fitting into the block, whereby the block is provided with a predetermined unitary thickness.

3. The method according to claim 1, wherein the block and the complementary insulating covering are connected to each other by applying a glue or adhesive to the outer contour of the block and/or the inner contour of the complementary insulating covering and pressing the complementary insulating covering onto the block.

4. The method according to claim 1, wherein the parts of the block being covered with the complementary insulating covering are connected with an adhesive tape.

5. The method according to claim 1, wherein an insulation element having a bulk density between 50 kg/m³ and 200 kg/m³, preferably between 100 kg/m³ and 180 kg/m³ and further preferably of 140 kg/m³ is used as primary material for the block.

6. The method according to claim 1, wherein a glue or adhesive is sprayed onto the outer contour of the block and/or the inner contour of the complementary insulating covering.

7. The method according to claim 1, wherein all transition sections in the outer contour of the block are chamfered.

8. The method according to claim 1, wherein a complementary insulating covering fulfilling an $s_d$ value of at least 1.500 m is used.

* * * * *